United States Patent [19]

McDonald

[11] 4,153,038
[45] May 8, 1979

[54] SOLAR ENERGY COLLECTING SYSTEM

[76] Inventor: Bernard McDonald, 7700 Seville Ave., Huntington Park, Calif. 90255

[21] Appl. No.: 824,495

[22] Filed: Aug. 15, 1977

[51] Int. Cl.² .............................................. F24J 3/02
[52] U.S. Cl. .................... 126/270; 250/203 R
[58] Field of Search ................. 126/270, 271; 250/203 R

[56] References Cited

U.S. PATENT DOCUMENTS

| 2,135,997 | 11/1938 | Arthuys | 126/270 |
|---|---|---|---|
| 2,712,772 | 7/1955 | Trombe | 126/270 |
| 3,305,686 | 2/1967 | Carter et al. | 250/203 |
| 3,917,942 | 11/1975 | McCay | 126/270 |
| 4,013,885 | 3/1977 | Blitz | 126/271 |
| 4,038,972 | 8/1977 | Orrison | 126/270 |
| 4,041,307 | 8/1977 | Napoli et al. | 126/270 |

*Primary Examiner*—Carroll B. Dority, Jr.
*Attorney, Agent, or Firm*—Christie, Parker & Hale

[57] ABSTRACT

A plurality of directional solar energy sensors are each positioned skyward at a different orientation defined by a unique combination of elevation and azimuth so only one sensor at a time receives appreciable solar energy. A solar energy collector is supported so it is movable in elevation and azimuth. Responsive to the sensors, the collector is moved to the unique combination of elevation and azimuth of the one sensor receiving solar energy. In one embodiment, the collector is positioned by a pair of fluid driven pistons in a cylinder corresponding to each sensor; the sun's heat received by the sensor expands the fluid and drives the pistons to position the collector accordingly.

8 Claims, 5 Drawing Figures 4,153,038

SOLAR ENERGY COLLECTING SYSTEM

BACKGROUND OF THE INVENTION

This invention relates to the utilization of solar energy and, more particularly to a solar energy collecting system in which the collector tracks the sun's movement.

In recent years, there has been a substantial amount of scientific effort devoted to the use of solar energy. One approach has been to employ a concentrator, such as a parabolic reflector that tracks the sun to maintain maximum collection of solar energy. In general, such concentrators use complex clockwork mechanisms or sophisticated electronic circuitry to track the sun.

SUMMARY OF THE INVENTION

According to the invention, a plurality of directional solar energy sensors are each positioned skyward at a different orientation defined by a unique combination of elevation and azimuth so only one sensor at a time receives solar energy. A solar energy collector is supported so it is movable in elevation and azimuth. Preferably, the collector is at the focus of a concentrator such as a parabolic reflector. Responsive to the sensors, the collector moves to the unique combination of elevation and azimuth of the one sensor receiving solar energy. Thus, as the relative position of the sun in the sky changes, the sensors repeatedly readjust the collector to the unique orientation defined by the sensor receiving the solar energy at the time.

A feature of the invention is a plurality of cylinders corresponding to the respective sensors and containing a heat expandable fluid. Each cylinder has a pair of pistons adapted to move the collector to the unique combination of elevation and azimuth of the corresponding sensor. When the corresponding sensor receives solar energy, the fluid is heated and the pistons are actuated to position the sensor.

BRIEF DESCRIPTION OF THE DRAWINGS

The features of specific embodiments of the best mode contemplated of carrying out the invention are illustrated in the drawings, in which.

DETAILED DESCRIPTION OF THE SPECIFIC EMBODIMENT

Figure 1:
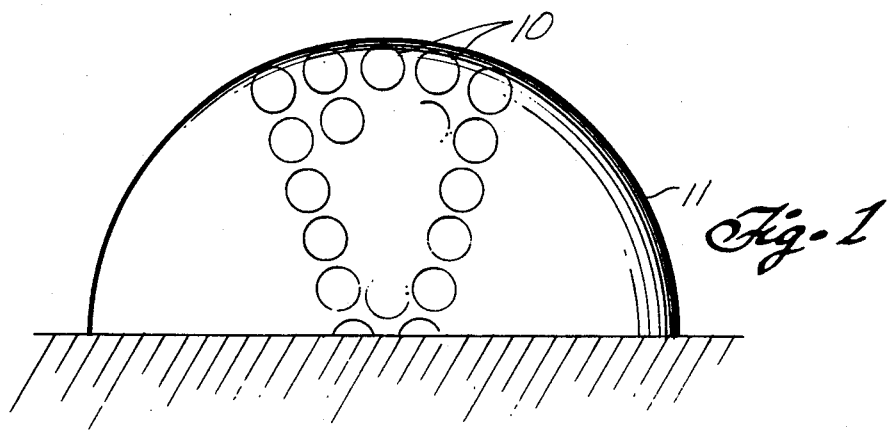
FIG. 1 is a schematic side view of a plurality of directional solar energy sensors arranged in accordance with the principles of the invention.
Figure 2:
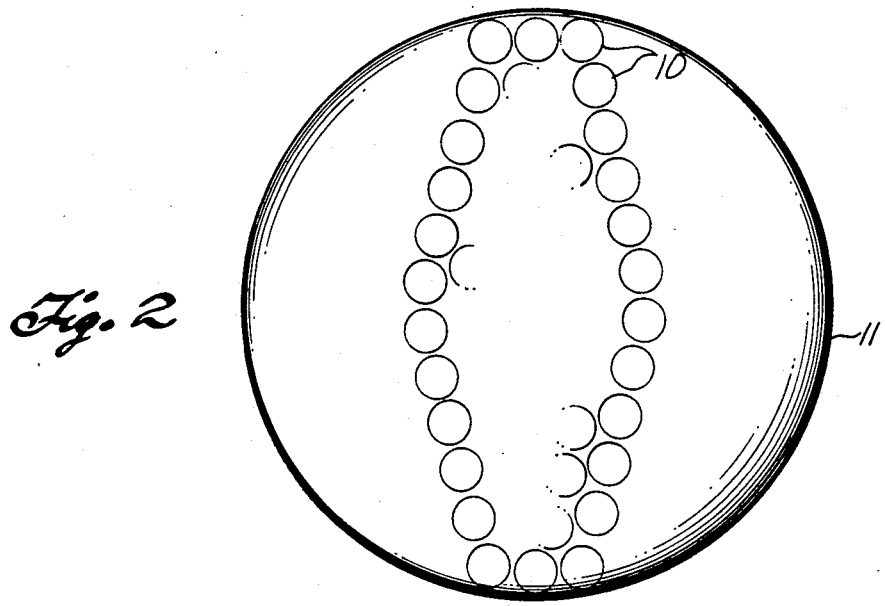
FIG. 2 is a top view of the sensors of FIG. 1.

In FIGS. 1 and 2, a plurality of directional solar energy sensors 10 are mounted on a hemispherical support 11. Sensors 10 are each positioned to point skyward at a different orientation defined by a unique combination of elevation and azimuth, so only one of sensors 10 receives appreciable solar energy at a time. It is not necessary to completely cover support 11 with sensors 10; it is only necessary to cover so much of support 11 as corresponds to the diurnal and seasonal changes in the sun's position. Sensors 10 are arranged with slightly overlapping fields of view, so no gap exists in their coverage.

Figure 3:
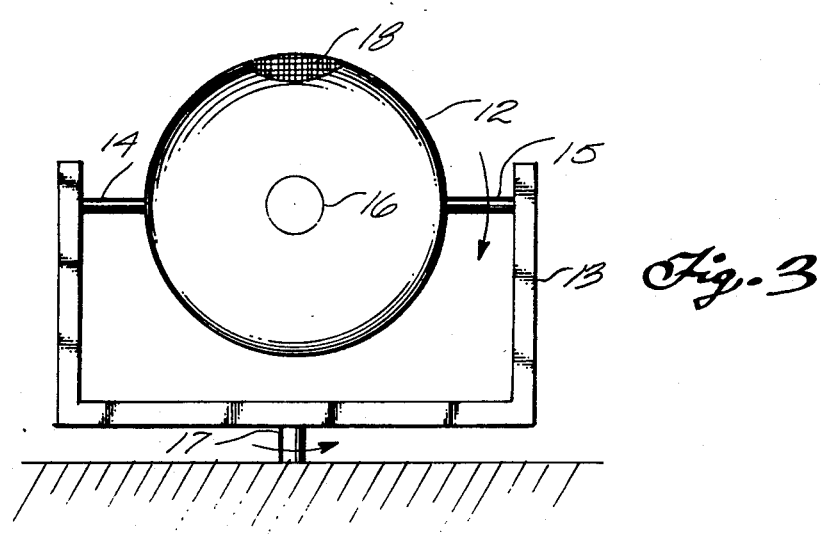
FIG. 3 is a schematic side view of a solar energy concentrator and collector positioned responsive to the sensors of FIG. 1.

In FIG. 3, a solar energy concentrator in the form of a parabolic reflector 12 is rotatably mounted on a frame 13 by horizontal trunions 14 and 15, which permit adjustment of the elevation of concentrator 12. Energy from concentrator 12 converges onto the parabolic focus where a solar energy collector 16 is located. By way of example, collector 16 could be a heat exchanger to transfer the solar heat to water or another medium for transmission to a place of energy utilization such as a residential heating system. Frame 13 is rotatably mounted on a vertical turret 17 to permit adjustment of the azimuth of concentrator 12. If desired, a portion 18 of concentrator 12 can be provided with solar cells, i.e., photovoltaic cells, to supply electrical energy, particularly to the electronics in the embodiment described below in connection with FIG. 5. In the absence of solar energy, concentrator 12 is biased by gravity or springs to the elevation and azimuth of the sunrise. Thus, after sundown, concentrator 12 is returned to a position ready to track the sun on the following day.

Figure 4:
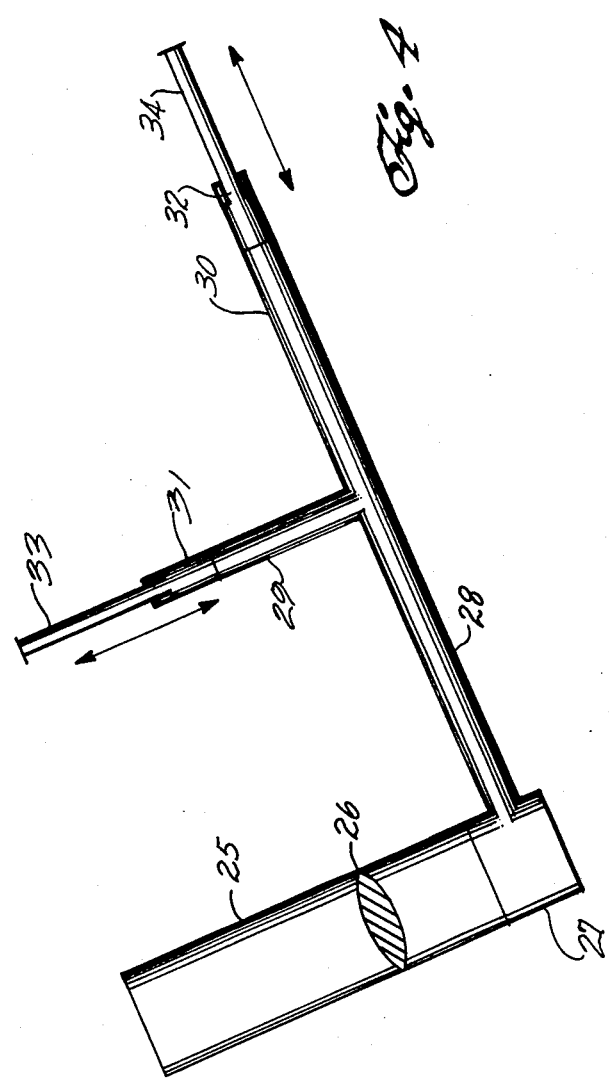
FIG. 4 is a schematic view of one embodiment for moving the concentrator and collector of FIG. 3, showing the cylinder corresponding to one of the sensors of FIG. 1.

In the embodiment of FIG. 4, each of sensors 10 comprises a long tube 25 in which a lens 26 is disposed to focus solar energy entering tube 25 onto an enlarged plenum 27 of a sealed cylinder 28. Cylinder 28 is filled with a heat expandable fluid such as air. Tube 25 is sufficiently long to provide the desired field of view as described above. Plenum 27 has a black outer surface adjacent to tube 25 so as to maximum the absorption of solar energy coupled thereto. Cylinder 28 has mutually perpendicular branches 29 and 30, in which pistons 31 and 32, respectively, lie. Piston 31 is connected to a rod 33, which acts upon trunions 14 and 15 to move concentrator 12 in elevation. Piston 32 is connected to a rod 34, which acts on turret 17 to position concentrator 12 in azimuth. As to the one sensor 10 that couples appreciable solar energy to its plenum 27, the solar energy heats the fluid within its cylinder 28, expands the fluid, and drives its pistons 31 and 32 so its rods 33 and 34 act upon trunions 14 and 15 and turret 17 to move concentrator 12 and collector 16 to the unique combination of elevation and azimuth of such sensor 10. As to the remaining sensors 10, which do not couple appreciable solar energy to their respective plenums 27, their respective rods 33 and 34 do not act on trunions 14 and 15 and turret 17 and, therefore, do not influence the position of concentrator 12.

Figure 5:
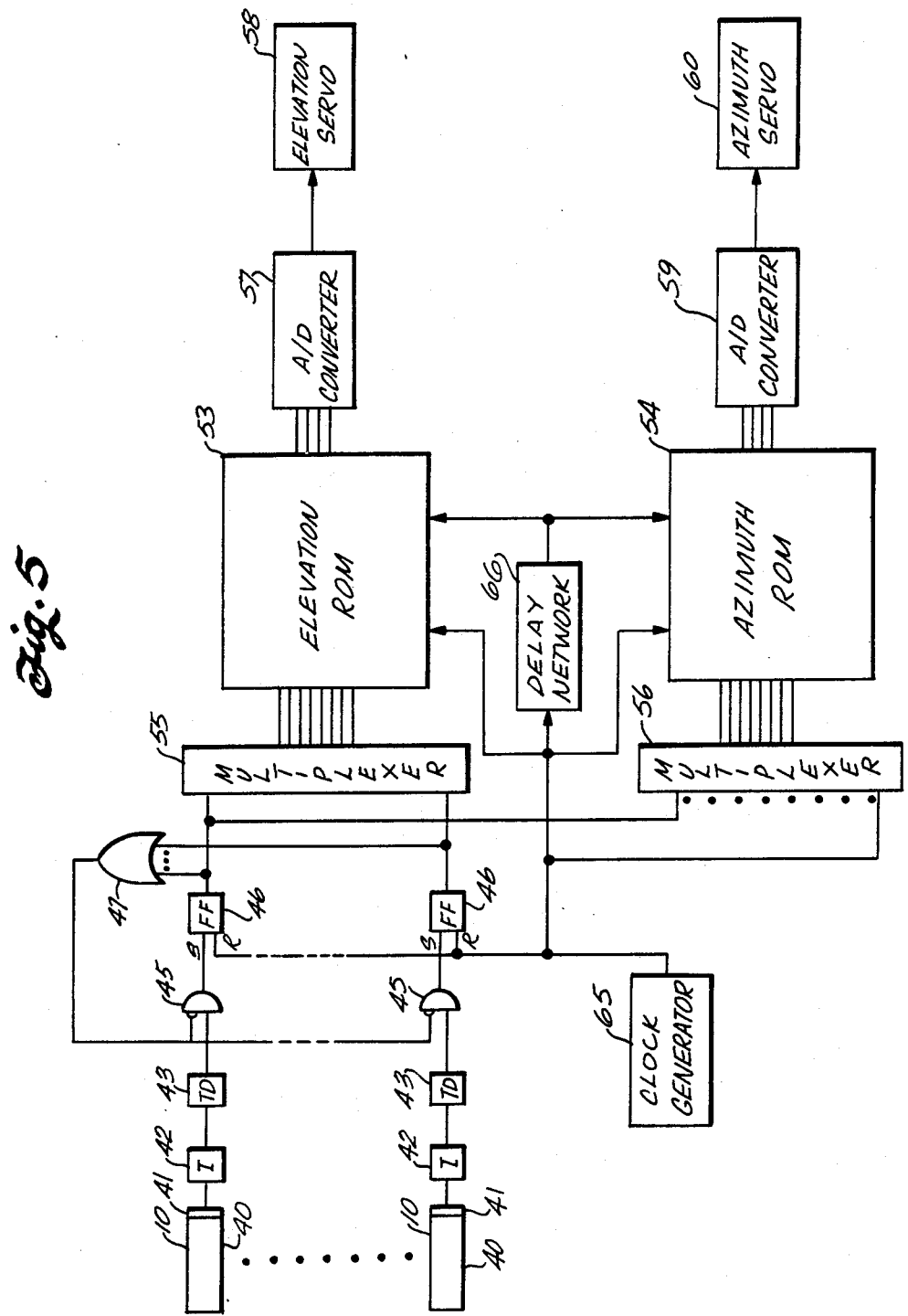
FIG. 5 is a schematic diagram of an alternative embodiment for moving the concentrator and collector of FIG. 3.

In the embodiment of FIG. 5, each of solar energy sensors 10 comprises a long tube 40 open at one end, and a photoelectric cell 41 located at the other end. Photoelectric cell 41 is connected to an integrator 42. The output of integrator 42 is coupled to a threshold detector 43, whose output is connected to the transmit input of an inhibit gate 45. The output of inhibit gate 45 is connected to the set input of an RS flip-flop 46. The output of each of flip-flops 46 is coupled through an OR gate 47 to the inhibit input of each of inhibit gates 45. The solar energy received by one of sensors 10 is converted by photoelectric cell 41 to an electrical signal which is integrated by integrator 42. When the integrated signal exceeds a threshold level, threshold detector 43 generates a trigger pulse, which is coupled through inhibit gate 45 to the R input of flip-flop 46, thereby setting flip-flop 46. To the extent that plural ones of sensors 10 having overlapping fields of view are concurrently receiving solar energy, the integrated signal corresponding to that one of sensors 10 receiving the most solar energy reaches the threshold level first to trigger the corresponding flip-flop 46. Thereupon, a signal is coupled through OR gate 47 to the inhibit input of inhibit gate 45 of each of the remaining ones of sensors 10 to prevent their corresponding flip-flops 46 from becoming set. As a result of the described priority circuitry, the flip-flop 46 that is set identifies the sensor 10 receiving the most solar energy and prevents the setting of more than one of flip-flops 46 at any given time. The value of elevation corresponding to each of sensors 10 is stored in digital form in a read only memory (elevation ROM 53). Similarly, the value of azimuth corresponding to each of sensors 10 is stored in digital form in a read only memory (azimuth ROM 54).

ROM's 53 and 54 could be conventional, commercially available components. For the purpose of discussion, it is assumed that ROM's 53 and 54 are each MCM-14524 124-bit, read only memories, described at page 7-368 of Semiconductor Data Library, Volume 5, McMOS Integrated Circuits, Series A published by Motorola Semiconductor Products, Inc. These ROM's are organized in a 256×4 bit pattern, i.e., there are 256 memory cells in each of which four bits of digital binary information can be stored. Different combinations of the eight input leads to each ROM are energized to address one of the 256 memory cells, and the four bits of binary data stored therein appear at the four output leads of the ROM.

The outputs of flip-flops 46 are coupled through a multiplexer 55 i.e., an address encoder, to ROM 53 and through a multiplexer 56, i.e., an address encoder to ROM 54. Multiplexers 55 and 56 energize a unique combination of the eight input terminals of ROM's 53 and 54 depending upon which of flip flops 46 is set. The output leads from ROM 53 are coupled to an analog-to-digital (A/D) convertor 57 to produce an analog signal having a magnitude representative of the value stored in ROM 53 for the elevation of that sensor 10 receiving appreciable, i.e., the most, solar energy at the time. The output of A/D convertor 57 is connected to an elevation servo, which positions concentrator 12 and collector 16 about trunions 14 and 15 to the elevation of that sensor 10 receiving appreciable solar energy. The output leads from ROM 54 are coupled to an analog-to-digital (A/D) convertor 59 to produce an analog signal having a magnitude representative of the value stored in ROM 54 for the azimuth of that sensor 10 receiving appreciable solar energy at the time. The output of A/D convertor 59 is connected to an azimuth servo, which positions concentrator 12 and collector 16 about turret 17 to the azimuth of that sensor 10 receiving appreciable solar energy. A clock generator 65, operating at a moderately low frequency, e.g., in the order of 100 Hertz or less, controls the cycle of ROM's 53 and 55. Clock generator 65 is directly coupled to the reset inputs of flip-flops 46 and the enable pins of ROM's 53 and 54, and indirectly through a delay network 66 to the clock pins of ROM's 53 and 54. Responsive to each clock pulse from generator 65, flip-flops 46 are reset and the four output pins of ROM's 53 and 54 are each cleared. Thereupon, one of flip-flops 46 will again become set, depending upon which of sensors 10 is receiving the most solar energy. After a short delay sufficient to accomplish this, e.g., several milliseconds, each clock pulse is applied to the clock pins of ROM's 53 and 54. Responsive to the negative going edge of each clock pulse applied to the clock pins, the binary elevation and azimuth values corresponding to the particular flip-flop 46 that is set appear at the output pins of ROM's 53 and 54, and responsive to the positive going edge of each clock pulse, this data becomes latched at the output pins until cleared when the cycle is repeated.

Thus, the invention provides a means for repeatedly moving a solar energy concentrator and/or collector to a unique combination of elevation and azimuth corresponding to the sensor that is receiving appreciable, i.e., the most, solar energy at the time so the concentrator in effect tracks the sun as it moves across the sky. In the embodiment of FIG. 4, the movement is accomplished mechanically by expandable fluid driven pistons heated by the solar energy itself; a pair of pistons correspond to each unique combination of elevation and azimuth of the respective sensors, and only that combination of pistons corresponding to the sensor receiving appreciable solar energy at the time is heated. In the embodiment of FIG. 5, the movement is accomplished electrically by servos responsive to elevation and azimuth values stored in read only memories, which are selectively addressed, depending upon which sensor is receiving solar energy; the electrical energy could be obtained from solar cells on the concentrator.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention. For example, instead of solar energy sensors having overlapping fields of view, the sensors could have mutually exclusive fields of view, in which case provision would have to be made for maintaining the position of the collector at the elevation and azimuth of the sensor receiving solar energy during the interval between which such sensor stops receiving solar energy and the next sensor begins receiving solar energy.

What is claimed is:

1. A solar energy collecting system comprising:
 a plurality of stationary directional solar energy sensors each positioned skyward at a different orientation defined by a unique combination of elevation and azimuth so only one sensor at a time receives appreciable solar energy;
 a solar energy collector;
 means for supporting the collector so it is movable in elevation and azimuth; and
 means responsive to the sensors for moving the collector to the unique combination of elevation and azimuth of the sensor receiving solar energy.

2. The system of claim 1, additionally comprising a parabolic reflector having a focus, the solar energy collector being located at the focus of the reflector, the moving means moving the reflector with the collector to maintain the collector at the focus of the reflector.

3. The system of claim 1, additionally comprising means for concentrating solar energy from a large area onto the collector.

4. The system of claim 3, in which the concentrating means comprises a parabolic reflector having a focus, the collector is located at the focus, and the moving means moves the reflector to maintain the collector at the focus.

5. The system of claim 4, in which each sensor includes a tube open at one end to receive solar energy, appreciable solar energy only reaching the other end of only one of the tubes at a time.

6. The system of claim 5, in which the moving means includes for each combination of elevation and azimuth a sealed cylinder containing an expandable fluid and a pair of pistons driven by the expansion of the fluid upon heating by the corresponding sensor receiving solar energy to move the collector to the unique combination of elevation and azimuth.

7. The system of claim 1, in which each sensor includes a tube open at one end to receive solar energy, appreciable solar energy only reaching the other end of only one of the tubes at a time.

8. The system of claim 1, in which the moving means includes for each combination of elevation and azimuth a sealed cylinder containing an expandible fluid and a pair of pistons driven by the expansion of the fluid upon heating by the corresponding sensor receiving solar energy to move the collector to the unique combination of elevation and azimuth.

* * * * *